March 30, 1954

J. P. JONES ET AL 2,673,410

IRONING MACHINE TRANSMISSION
AND CONTROL MEANS THEREFOR

Filed Jan. 25, 1952

INVENTORS.
JOHN P. JONES and
HAROLD F. BROGDON
BY

*M. W. Green*

ATTORNEY.

March 30, 1954

J. P. JONES ET AL 2,673,410

IRONING MACHINE TRANSMISSION
AND CONTROL MEANS THEREFOR

Filed Jan. 25, 1952

*INVENTORS.*
JOHN P. JONES and
BY HAROLD F. BROGDON

ATTORNEY.

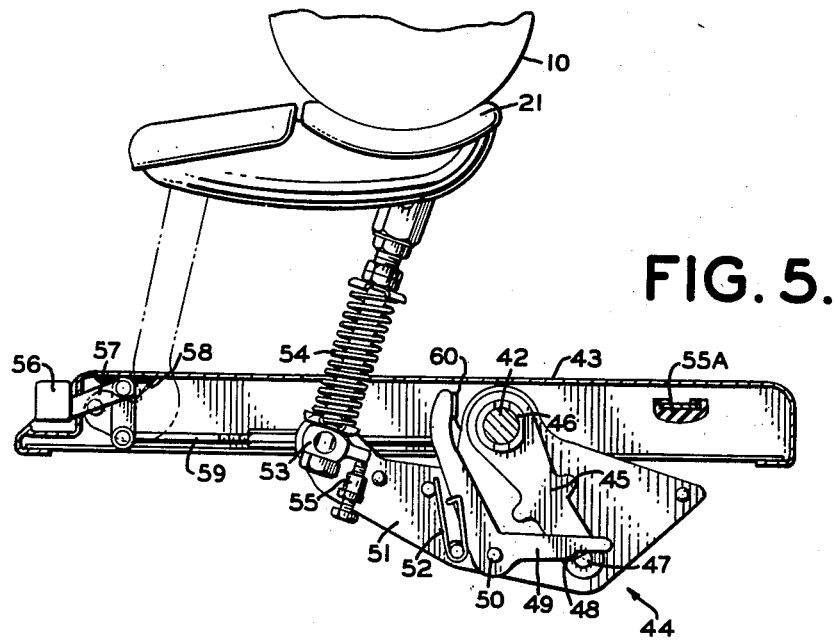
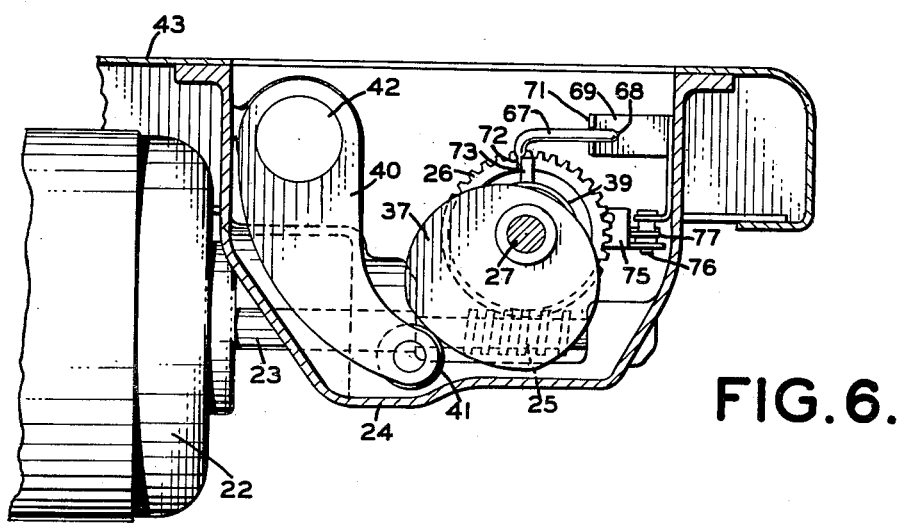

March 30, 1954

J. P. JONES ET AL 2,673,410

IRONING MACHINE TRANSMISSION
AND CONTROL MEANS THEREFOR

Filed Jan. 25, 1952

INVENTORS.
JOHN P. JONES and
BY HAROLD F. BROGDON

ATTORNEY.

March 30, 1954

J. P. JONES ET AL 2,673,410

IRONING MACHINE TRANSMISSION
AND CONTROL MEANS THEREFOR

Filed Jan. 25, 1952

INVENTORS,
JOHN P. JONES and
BY HAROLD F. BROGDON

ATTORNEY.

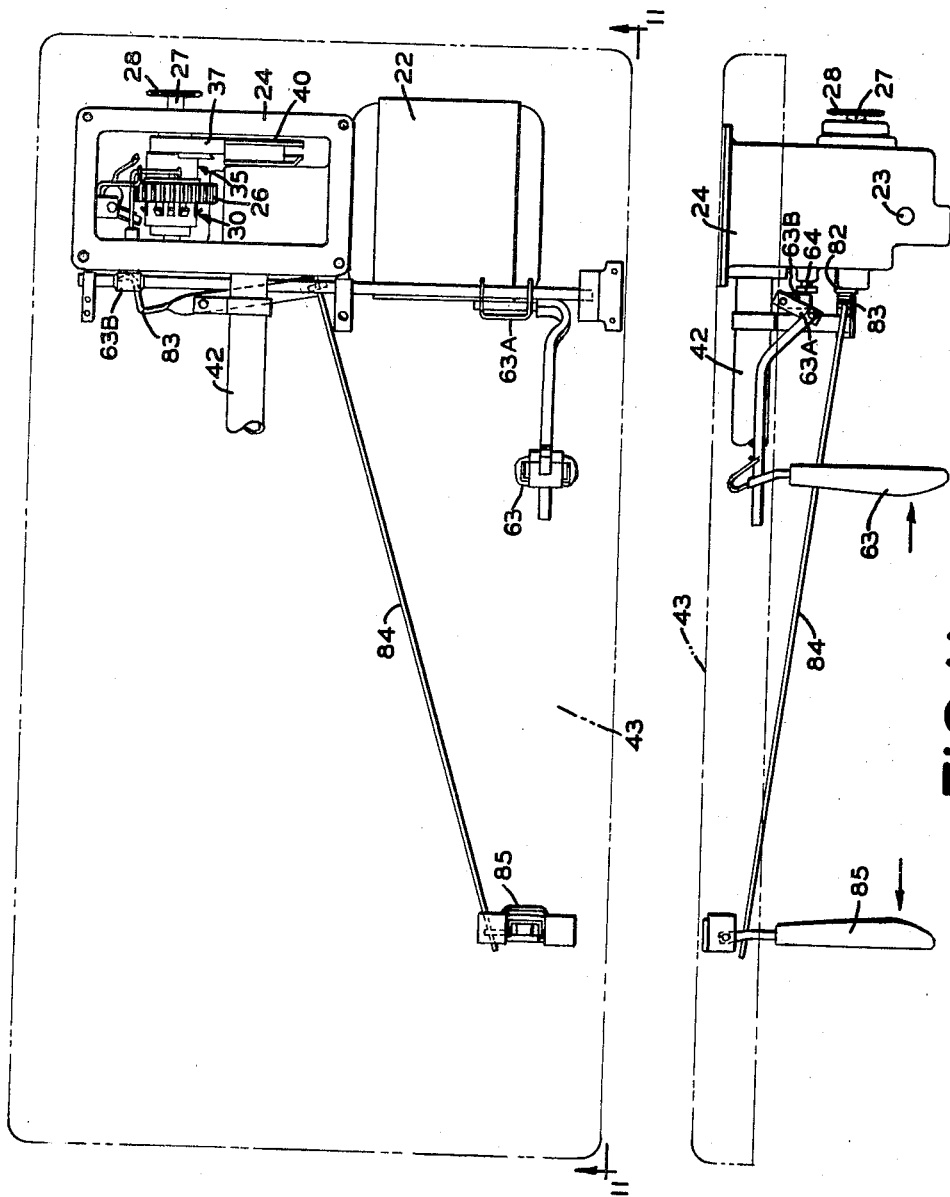

Patented Mar. 30, 1954

2,673,410

UNITED STATES PATENT OFFICE 2,673,410

IRONING MACHINE TRANSMISSION AND CONTROL MEANS THEREFOR

John P. Jones and Harold F. Brogdon, South Bend, Ind., assignors to Bendix Home Appliances Division—Avco Manufacturing Corporation, South Bend, Ind., a corporation of Delaware Application January 25, 1952, Serial No. 268,228

5 Claims. (Cl. 38—61)

This invention relates to improvements in ironing machines of the type employing a padded roll and a heated shoe and more particularly to automatic driving means and control mechanism therefor to cause articles to be pressed in a satisfactory manner between the roll and the shoe. The invention may be applied to an ironing machine of the general type shown and described in U. S. Patent No. 2,456,385 dated December 14, 1948.

It is a primary object of the present invention to provide an ironing machine with an improved driving mechanism and control means therefor.

It is a further object to provide such a driving mechanism and control means therefor having fewer moving parts and requiring fewer adjustments than machines of this general type manufactured heretofore; such mechanism comprising a compact, efficient gearing utilizing spring clutches and providing a substantial ease of assembly.

It is a still further object to provide a mechanism utilizing a spring clutch to provide a retarding force to overcome the tendency of the shoe operating cam to override the speed of its driving connection in retracting the shoe from ironing position.

The above and other objects and advantages of the present invention will become more readily apparent from the following more detailed description and by reference to the accompanying drawings forming a part hereof and wherein:

Figure 5 is a view similar to Figure 3, showing the general arrangement of the same elements in their operative position to press articles being passed between the roll and the shoe;

Figure 6 is a cross-sectional view similar to Figure 4 showing the general arrangement of the shoe driving elements in the positions assumed when the shoe is in the position shown in Figure 5;

Figure 10 is a plan view showing the general arrangement of the transmission and clutch actuating levers with the knee control levers;

Figure 11 is a front elevation of the view shown in Figure 10 and further illustrates the arrangement of knee control and clutch actuating levers; the view being taken along the line 11—11 of Figure 10;

Figure 12:
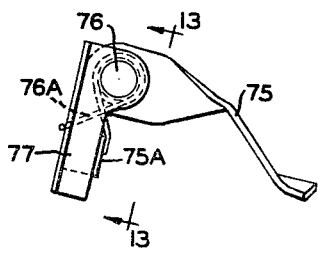
Figure 13:
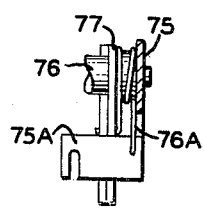

Figure 12 is a plan view of one portion of the control mechanism showing with more particularity the construction of the levers for actuating the roll clutch and the arrangement thereof which provides for synchronization of the actuation with respect to the movement of the shoe; and Figure 13 is a partial sectional view of the mechanism shown in Fig. 12, the view being taken along the line 13—13 of Figure 12.

Figure 7:
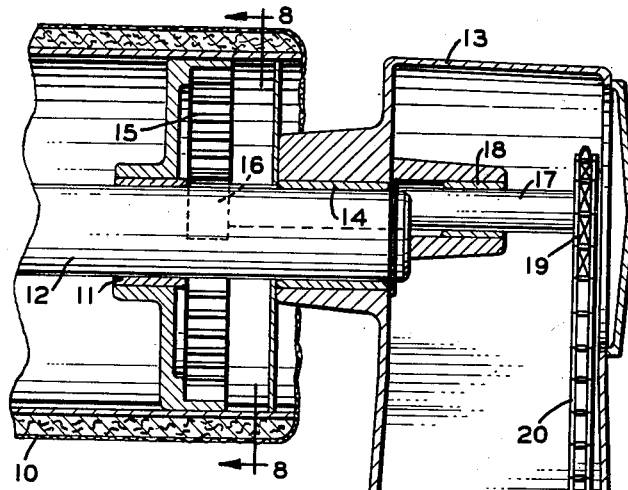
Figure 7 is a cross-sectional view through the transmission mechanism showing the general arrangement of the component parts thereof including the roll driving elements and general arrangement of the clutch operating levers.
Figure 8:
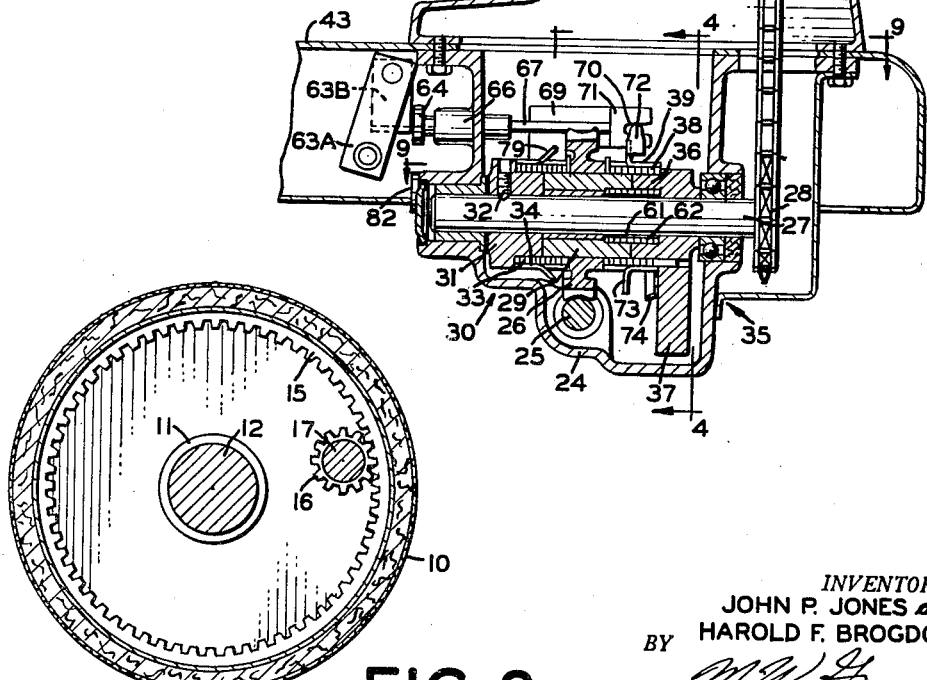
Figure 8 is a cross-sectional view through the roll showing the roll driving pinion and ring gear; the view being taken along the line 8—8 of Figure 7.

Referring to the drawings, and particularly to Figure 7, a tubular, padded ironer roll 10 is mounted for rotation, supported and driven from one end thereof, the end support being effected by means of a suitable bearing 11 and a shaft 12 which is supported in and which extends outwardly from a casing 13; there being a suitable bearing 14 in the casing 13 for support of the shaft 12. Concentric with the bearing 11 is an internal ring gear 15 rigidly secured to the inner surface of the roll 10. It will become apparent upon insertion of Figures 7 and 8 that the roll 10 is mounted for free rotation upon the stationary shaft 12 by means of the bearing 11 and is driven for rotation thereabout through the ring gear 15 by means of a meshing pinion 16. The pinion 16 is rigidly secured to one free end of a shaft 17 journaled within suitable bearings 18 in the casing 13. On the opposite free end of the shaft 17 a sprocket 19 is rigidly secured, and a drive chain 20 meshing therewith is adapted to drive the sprocket 19 through means to be more fully described presently.

Figure 3:
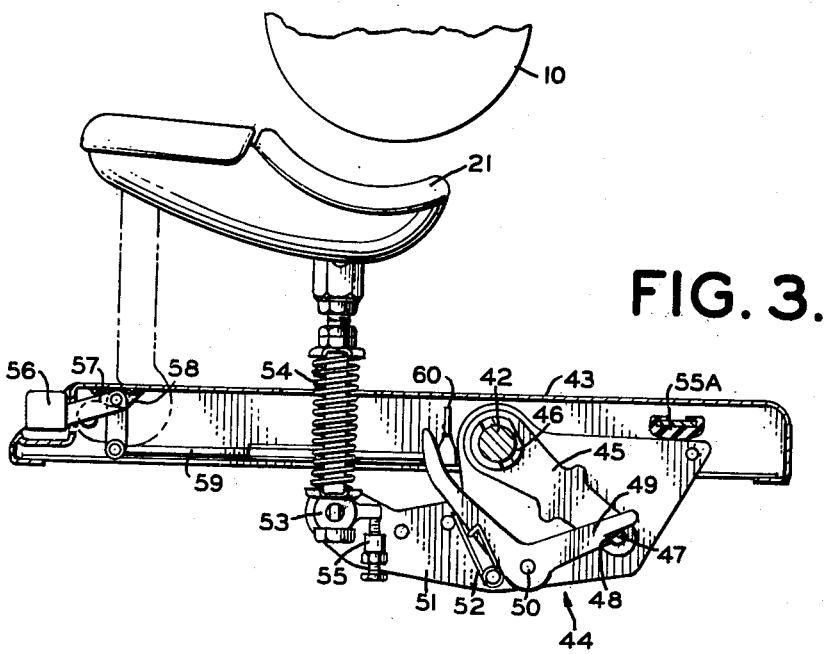
Figure 3 is a view similar to Figure 2, showing the general arrangement of these elements in their normal down position with the shoe away from the roll.
Figure 4:
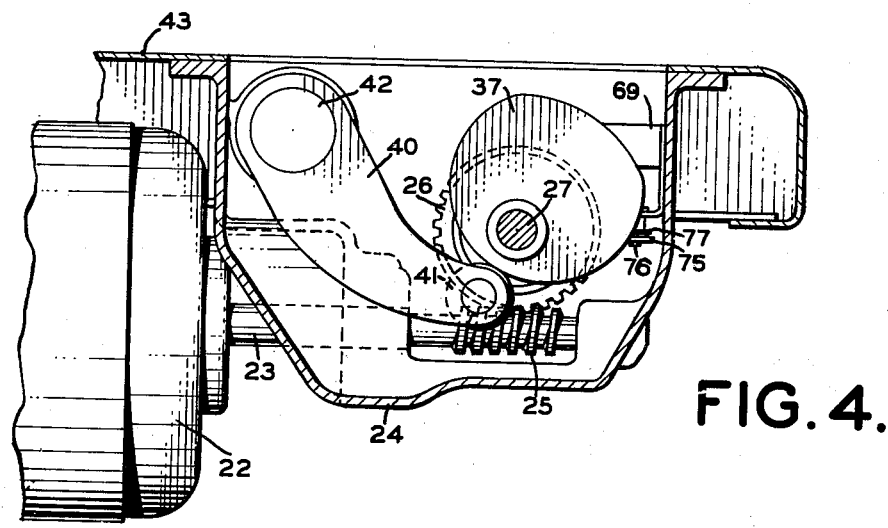
Figure 4 is a cross-sectional view through the transmission mechanism showing the general arrangement of the shoe driving elements in the position assumed when the shoe is in the position shown in Figure 3, the view being taken along the line 4—4 of Figure 7 to be later described.

Referring now to Figures 3 and 4, a shoe 21 is shown as being supported at a point slightly below the roll 10 and is centered slightly forward of the axis of rotation thereof. The shoe 21 is mounted for relative movement toward and away from pressing contact with the roll 10. Power for rotating the roll 10, and for moving the shoe 21 into and out of pressing engagement therewith is supplied by means of a suitable fractional horsepower electric motor 22 having a drive shaft 23 interconnecting with a new and novel transmission mechanism supported within a casing 24.

Referring to Figures 4, 6 and 7, a worm shaft 25 inter-connected with the motor shaft 23 by any suitable means is mounted for rotation within the casing 24. A worm wheel 26 is positioned in meshing engagement with the worm shaft 25 and is rotated thereby at a substantially slower speed than the speed of motor 22. Extending through the casing 24 is a shaft 27 having at one end thereof a sprocket 28 rigidly connected thereto and adapted to mesh with the drive chain 20. It can readily be seen that rotation of the shaft 27 will thus impart a rotation of like direction to the roll 10.

Surrounding the shaft 27 and rigidly secured to the worm wheel 26 as a part thereof is a sleeve member 29 which comprises a common driving element for two separate coil spring, friction clutches 30 and 35 positioned adjacent opposite faces of the worm wheel 26. The roll driving clutch 30 comprises the sleeve 29, a cylindrical driving hub 31 rigidly secured to the shaft 27 by means of a set screw 32, and a helically wound coil spring 33. The sleeve 29 and the hub 31 have equal external diameters and are preferably made from a hardened steel so that they will not wear excessively by reason of their frictional engagement with the clutch spring 33. The clutch spring 33 extends over both the hub 31 and the sleeve 29. The end which is wound onto sleeve 29 is upturned and passes through an aperture in a sleeve 34 surrounding the spring 33. The spring 33 is so wound as to have a slight interference fit over the ends of the sleeve 29 and the hub 31, and it is understood that the construction is such that the direction of rotation of the worm wheel 26 tends to wrap the spring 33 tightly about the sleeve 29 and the hub 31 thereby locking them together for rotation as a single unit by reason of the frictional engagement of the spring 33.

Figure 9:
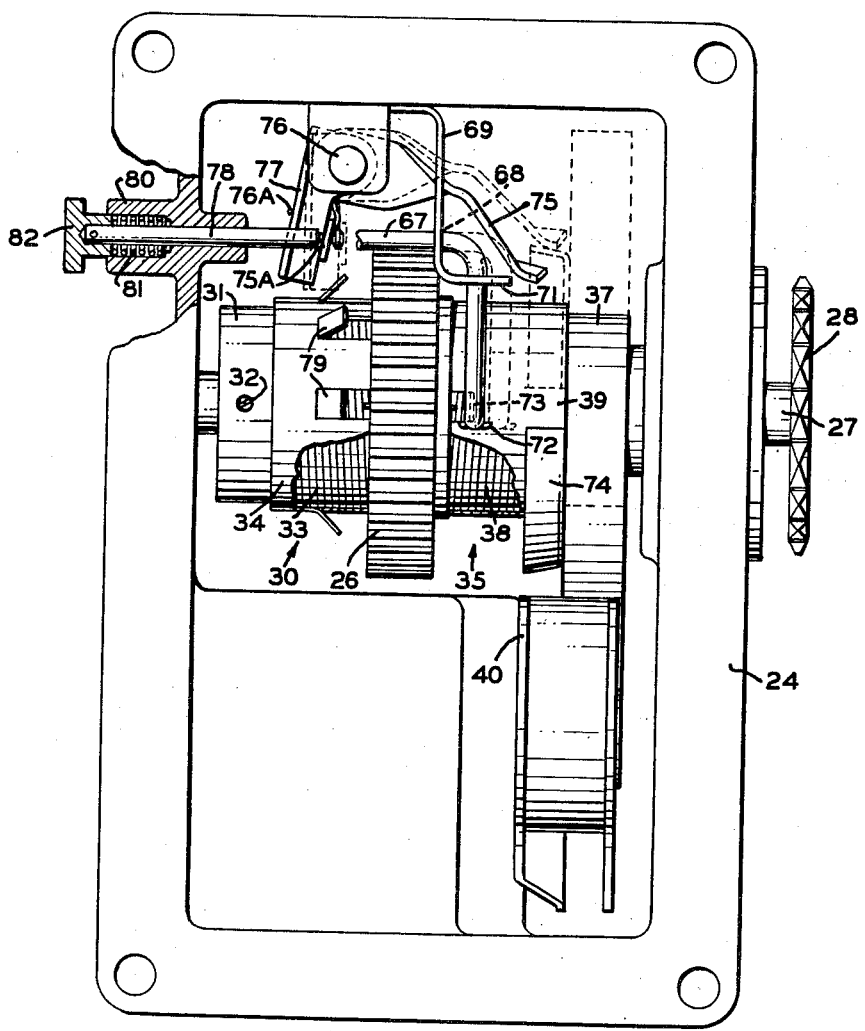
Figure 9 is a plan view, partially in cross-section, of the transmission mechanism illustrating the general arrangement of the component parts thereof and showing the positions assumed by the clutch operating levers in their operative and inoperative positions; the view being taken substantially along the line 9—9 of Figure 7.

The second spring clutch 35 for driving the shoe 21 into and out of engagement with the roll 10 comprises, the sleeve 29, a cylindrical hub 36 extending outwardly from the face of a cam 37, and a helically wound coil spring 38. The cam 37 is mounted so as to be freely rotatable about the shaft 27 and, as can be seen in Figure 9, the spring 38 is wound opposite hand to the spring 33, it being on the opposite face of the worm wheel 26. The sleeve 29 and the hub 36 likewise have equal external diameters and are made of hardened steel as in clutch 30. The spring 38 is also wound so as to have a slight interference or frictional driving fit over the sleeve 29 and hub 36. One end of the spring 38 is upturned through an aperture in a sleeve 39 surrounding the spring 38. It should now be apparent that this construction is such that rotation of the worm wheel 26 will tend to also wrap the spring 38 tightly about the sleeve 29 and the hub 36 thereby locking them together for rotation as a single unit by reason of the frictional engagement of the spring 38.

As previously mentioned, the hub 36 (Fig. 7) extends outwardly from the face of the cam 37 and, as may be seen by inspection of Figures 4 and 6, on rotation the cam 37 is arranged to impart an oscillatory movement to a lever 40 against which it operates by contact with a cam contacting follower which comprises a roller 41 mounted for free rotation on one end of the lever 40. The opposite end of the lever 40 is associated with a shoe actuating mechanism now to be described.

The lever 40 is rigidly secured to a transfer shaft 42 thereby to impart a rocking or oscillatory movement thereto on movement of the lever 40 due to the contour of the cam 37. The transfer shaft 42 extends from the casing 24 beneath the table surface 43 to a point approximately midway of the length of the shoe 21 where it is connected to a multi-articulated linkage 44 which is arranged to transmit the movement of the transfer shaft 42 into movement of the shoe 21.

The linkage assembly 44 (see Figs. 2, 4 and 6) comprises a lever 45 having a hub 46 surrounding the shaft 42 and rigidly secured thereto by means such as a taper pin extending transversely through the center of the shaft 42 and the hub 46. Adjacent the lowermost portion of the lever 45 is located a pin 47 which is arranged to engage a shoulder portion 48 of a bell crank lever 49 pivotally connected at 50 to a plate 51 which is arranged to oscillate about the transfer shaft 42. A spring 52 normally biases the bell crank lever 49 toward the pin 47. Located adjacent the left end of the plate 51 is a shaft 53 about which is oscillatably mounted one end of a resilient compression member 54. The opposite end of the compression member 54 is similarly mounted on the bottom portion of the shoe 21. An adjustable stop pin 55 is provided adjacent the shaft 53 and a resiliently padded bumper 55A is also provided to limit the movement of the shoe 21 on a downward direction away from the roll 10. It may be seen that the roll 10 will limit the movement of the shoe 21 in an upward direction.

Referring now to Figures 5 and 6 which illustrate one position of the transmission mechanism and shoe actuating mechanism; it can be seen (Fig. 6) that the cam 37 and the lever 40 are in the position of maximum travel in the direction for driving the shoe 21 toward the roll 10. Figure 5 shows the positions assumed by the shoe actuating linkage 44 corresponding to the position of the transmission elements shown in Fig. 6.

Figures 3 and 4 illustrate the positions of these same mechanisms when the shoe has been retracted to its normal down position. This movement is caused by rotation of the cam 37 approximately 180° from the position shown in Figures 5 and 6. This rotation of the cam 37 and resulting angular displacement of the lever 40 transmits the same relative angular displacement to the shoe actuating linkage 44 through the transfer shaft 42. The various elements of the shoe actuating linkage 44 retain their same relative positions with respect to each other throughout this angular displacement.

Figure 1:
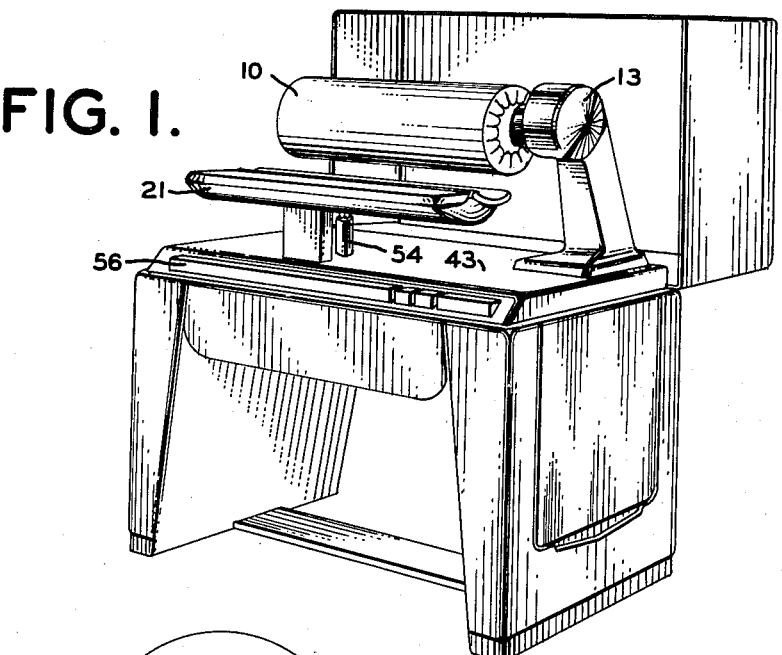
Figure 1 is a perspective view of an ironing machine exterior showing the general positions and arrangement of the shoe, roll, driving mechanism and control members therefor; and is of the general type to which the present invention is more particularly adapted for use.
Figure 2:
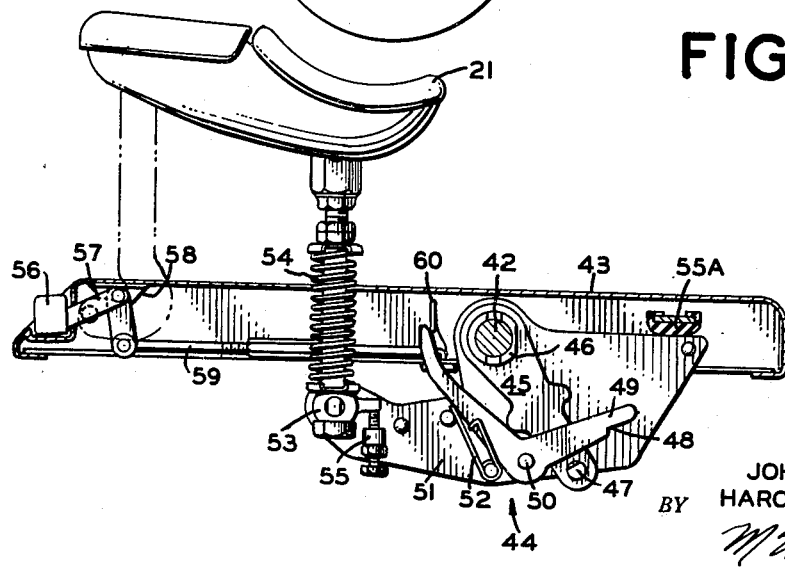
Figure 2 is a view partially in cross section showing the general position of the roll, the shoe, the shoe support, and emergency release control levers in the emergency release position.

Figure 2 illustrates the position assumed by the elements of the shoe actuating linkage 44 when an emergency release lever 56 is depressed. The emergency release lever 56 has a bell crank lever 57 attached thereto which is pivotally held in a bracket 58 attached to the under side of the table surface 43. The opposite end of the bell crank lever 57 has a rod 59 pivotally attached thereto, which rod 59 is arranged by means of another bell crank lever 60 to dislodge the shoulder portion 48 of lever 49 from the pin 47 whereupon the plate 51 is then free to move with respect to the transfer shaft 42. It should be noted that when the shoe 21 is moved into ironing position against the roll 10 considerable pressure is exerted thereagainst due to the design of the linkage 44, which pressure is transmitted thereto through the compression member 54. It should now be apparent that depression of the emergency lever 56 to dislodge the bell crank lever 49 as above discussed will result in a quick release of the shoe 21 from the roll 10 due to the pressure built up in the compression member 54 whereupon the shoe 21 and its actuating linkage will assume the position shown in Figure 2.

It will be understood by those skilled in this art that considerable pressure is developed by the engagement of the shoe 21 and the roll 10 (Fig. 5) and that the resilient compression member 54 holding the shoe 21 would tend to accelerate the normal movement of the shoe away from the roll during movement of the shoe away from the roll in the absence of a retarding force. Referring again to Figure 7, it may be seen that the present invention contemplates the use of a third coil spring friction clutch to act as the needed retarding force. A bored recess is provided in both the sleeve 29 and the hub 36 which, when in assembled relationship upon the shaft 27, provide an annular pocket 61 for the reception of a small helically wound clutch spring 62. This spring 62 is wound so as to have an interference fit on the internal surfaces of the sleeve 29 and the hub 36 and is wound in the same direction as the spring 38. As previously stated, the extreme pressure built up in the compression member 54 tends to accelerate the movement of the shoe 21 away from the roll 10. When this pressure is transmitted through the transfer shaft 42 and lever 40, it creates a tendency for the cam 37 to overdrive the worm wheel 26 which, if unretarded, would allow the shoe 21 to drop too rapidly and result in the shoe actuating mechanism 44 coming to an abrupt stop with considerable force against the stop pin 55 and the bumper 55A. Such action would also cause the transmission to be unnecessarily noisy and jerky in its operation at these points due to the change in speed of the cam 37 with respect to the speed of the worm wheel 26. From the above description it is apparent that the provision of the small internal spring clutch comprising spring 62 in pocket 61 between the sleeve 29 and the hub 36 results in the frictional contact with sleeve 29 and hub 36 resisting tendency for the cam 37 to rotate ahead of the worm wheel 26 thereby providing the necessary retarding force to overcome the tendency of the pressure in the compression member 54 to cause the cam 37 to override the speed of the worm wheel 26.

Let it be assumed that the shoe 21 is in its normal down position (Figure 3) with the motor 22 running, and the operator desires to have the shoe 21 moved into its ironing position against the roll 10. In order to accomplish this result, a knee control lever 63 is provided (see Figs. 10 and 11) beneath the table surface 43 in such a position as to be operable by movement of the right knee of the operator when sitting in the proper position in front of the machine. Movement of this lever 63 to the right is arranged through a suitable linkage 63A—63B to cause a control button 64, which extends outwardly from the casing 24, to also be moved to the right against the bias of a compression spring (not shown) housed in a boss 66 protruding from the casing 24. Attached to the button 64 is a rod 67 (Fig. 9) which extends into the casing 24 in such a manner as to pass through an aperture 68 in a bracket 69 rigidly mounted to a wall of the casing 24. The rod 67 has a right-angle extension thereof which is arranged so as to be slidable in a slot 70 on a leg 71 of the bracket 69. As can be seen in Figs. 7 and 9, the free end 72 of the rod 67 is flattened out so as to provide a surface for engagement with one or the other of two lugs 73 projecting from the sleeve 39 surrounding the spring 38 and spaced substantially 180° from each other. The end 72 of the rod 67 is arranged to normally engage one of these lugs 73 thereby to prevent the sleeve 39 from rotating and thus preventing the spring 38 from winding down to frictionally drive the cam 37 even though the worm wheel 26 may be rotated. In other words, when the end 72 of rod 67 is in contact with a lug 73, the worm wheel 26 is in free-wheeling relationship with respect to the cam 37. Movement of the control button 64 to the right, therefore, will cause the end 72 of the rod 67 to assume the dotted line position of Figure 9, which position is displaced from the path of the lugs 73 and the spring 38 will then wind down to tightly engage the sleeve 29 and the hub 36 to cause them to rotate together as previously mentioned. The lugs 73 are spaced substantially 180° apart from each other, as previously mentioned, in order that the clutch 35 may be disengaged after each successive half-revolution of the cam 37, provided the knee control lever 63 is released soon after it has been depressed which is the normal method of operating the machine and which release will cause the end 72 of rod 67 to reengage the lug 73.

It should now be apparent that the operator can cause the shoe 21 to be moved into ironing engagement with the roll 10 merely by depressing and immediately releasing the knee control lever 63, whereupon the clutch 35 causes the cam 37 to be rotated 180°, from the position shown in Figure 4 to the position shown in Figure 6. This movement of the cam 37, as previously described, will cause the shoe 21 to move from the position shown in Figure 3 to the position shown in Figure 5 where it will remain due to the interruption of the rotation of cam 37 caused by the return of the end 72 of rod 67 into the path of lugs 73 which movement is assured by the bias of the compression spring within boss 66 acting on button 64 upon release of the knee control lever 63.

Referring to Figure 9, it may be seen that the inner face of the cam 37 is provided with a second and smaller cam 74 which is arranged to contact and move a lever 75 which is in turn pivotally supported on the bracket 69 by means of a shaft 76. The lever 75 is operatively connected to another lever 77 by means of a torsion spring 76A (Fig. 12) wound around the shaft 76. The lever 75 is arranged at one point 75A thereon to receive the end of a control rod 78 and is arranged to be moved into and out of the path of a plurality of lugs 79 protruding from the sleeve 34 surrounding the clutch spring 33. The clutch 30, as previously mentioned is arranged to impart a rotation to the roll 10; and this driving action is accomplished when the lever 77 is moved out of the path of the lugs 79 thereby permitting the spring 33 to wind down on the sleeve 29 and the hub 31. As shown by the full line positions of the cam 37, the lever 75, and the lever 77; it may be seen that the construction provides an interlocking control arrangement which synchronizes the actuation of the roll clutch 30 with the movement of the shoe 21 into ironing position, thereby assuring that the roll begins rotation substantially at the same time that the shoe is moved to its limiting position against the roll. The full line positions above mentioned correspond to the positions of the mechanisms shown in Figures 5 and 6; and the dotted line positions thereof correspond to the positions shown in Figures 3 and 4.

The control rod 78, attached to the lever 75, extends through a wall of the casing 24 in a plane directly beneath the rod 67. A boss 80, protruding from the casing 24, houses a compression spring 81 which serves to bias the lever 77 to a position out of the path of lugs 79. Attached to the end of rod 78 is another control button 82 which is arranged to be moved against the bias of spring 81 by means of a suitable toggle linkage 83—84 (Figs. 10 and 11); which linkage is actuated by means of a knee control lever 85 positioned beneath the table surface 43 so as to be operable by movement of the left knee of the operator. By manipulation of the knee control lever 85, the operator may cause the roll 10 to be stopped in its rotation independently of the position of lever 75 and 77 with respect to the positions of the cams 37 and 74. For example, let it be assumed that the operator is ironing a dampened garment with the shoe 21 in position against the roll 10 and the roll rotating in the normal manner (Fig. 5). In the event the operator wishes to stop the roll 10 to press a particularly damp area such as a seam having several folds of material; it is possible to do so by merely depressing the left knee control lever 85 to disengage the clutch 30 thereby stopping the rotation of the roll without effecting any change in the position of the shoe 21. To resume the rotation of the roll, the operator then merely releases the control lever 85 thereby causing the clutch 30 to be reengaged and therefore impart rotation to the roll.

Figures 12 and 13 illustrate with more particularity the construction of the levers 75 and 77, and illustrate the manner in which the torsion spring 76A biases them to assume a definite position with respect to each other. The arrangement of the torsion spring 76A about the shaft 76 is such that it urges the lever 75 to rotate in a clockwise direction about the shaft 76; and the lever 77 is urged to rotate in a counterclockwise direction as viewed in either Figure 9 or Figure 12. The long leg of lever 75, and lever 77 as viewed in Figure 12, are arranged to be disposed at an angle of substantially 90° with respect to each other and are prevented from assuming an angle less than that due to the upturned portion 75A of lever 75 acting as a stop against which the lever 77 abuts.

Let it be assumed that the levers 75 and 77 are in the position shown in full lines in Figure 9; which position they assume when the roll 10 is rotating. Now, if the operator actuates the right knee control 63 to cause the shoe 21 to move away from the roll 10, the cam 37 will rotate 180° to the dotted line position and the small cam 74 will pick up the end of lever 75 to also move it to the dotted line position. During this movement the sleeve 34 is rotating and therefore one of the lugs 79 may interfere with the movement of lever 77 to its dotted line position. If this circumstance arises, the arrangement of the torsion spring 76A is such that it will permit the lever 75 to move to its dotted line position against the bias of the spring 76A and the lever 77 will not assume its dotted line position until such time as the lugs 79 are in a position to allow the lever 77 to drop into place between two of them and thus stop the rotation of the sleeve 34.

While the present invention has been described in connection with one illustrative embodiment, it is not intended that it be limited to that particular embodiment, nor otherwise than by the terms of the appended claims.

We claim:

1. In an ironing machine having an ironing element movable to and from ironing contact, a mechanism for effecting said movement, a resilient member in said mechanism, a cam and a cam follower in said mechanism for effecting movement to and from said contact, said cam having a high position to hold said ironing element in contact, a coil spring friction clutch engageable with said cam to move said cam to and from said high position, a second coil spring friction clutch in said mechanism of opposite torsion effect to said first mentioned clutch whereby said first clutch will continue positive connection and will not overrun on movement of said follower on said cam from said high position and in a direction to release said ironing element.

2. In an ironing machine, a roll, a shoe, a source of power, a shoe actuating coil spring friction clutch arranged to be driven from said power source, a roll driving clutch arranged to be driven from said power source, a power transmitting connection, including a cam between said shoe actuating clutch and said shoe for moving the shoe bodily against or away from said roll, a second power transmitting connection between said roll driving clutch and said roll for rotating said roll upon its axis, resilient means operating to oppose the movement of said shoe against said roll and operating to assist the movement of said shoe away from said roll, and a retarding coil spring friction clutch arranged to prevent said cam from overrunning said shoe actuating clutch when said resilient means is operating to assist the movement of said shoe away from said roll.

3. In an ironing machine, a power source, a shoe, actuating mechanism for said shoe comprising, a driving clutch element driven by said power source, a driven clutch element, means arranged to selectively connect and disconnect said driving and driven clutch elements comprising a helically wound friction clutch spring having one or more turns thereof frictionally engaging each of said driving and driven clutch elements and control means therefor, a cam operatively connected to said driven clutch element, a power transmitting connection between said cam and said shoe, resilient means in said connection operating to oppose the movement of said shoe to one of its limiting positions and operating to assist the movement of said shoe to the other of its limiting positions, and retarding means interconnecting said driving and driven clutch elements to prevent said driven clutch element from overrunning said driving clutch element when said resilient means is operating to assist the movement of said shoe to one of its limiting positions, said retarding means comprising a second helically wound friction clutch spring having one or more turns thereof frictionally engaging each of said driving and driven clutch elements.

4. An actuating mechanism for an ironing machine shoe comprising, a power source, a driving element connected to said power source, a driven element arranged to be operatively connected with and disconnected from said driving element, a power transmitting connection between said driven element and the shoe, a one-way coil spring friction clutch arranged to intermittently interconnect said driving element and said driven element, a resilient member in said power transmitting connection operating to oppose the movement of the shoe to one of its limiting positions and operating to assist the movement of the shoe to the other of its limiting positions, and a second one-way coil spring friction clutch interconnecting said driving element and said driven element, said second clutch arranged to prevent said driven element from overrunning said driving element when said resilient member is operating to assist the movement of the shoe.

5. In an ironing machine, a roll, a shoe, power means for rotating said roll and for moving said shoe into and out of engagement therewith, a driving clutch element arranged to be driven by said power means, a driven coil spring friction clutch element and clutch means for intermittently interconnecting same with said driving clutch element, eccentric means carried by said driven clutch element, a power transmitting connection between said eccentric means and said shoe, a resilient member in said power transmitting connection, said resilient member operating to oppose the movement of said shoe into engagement with said roll and operating to assist the movement of said shoe away from said roll, and a second coil spring friction clutch means interconnecting said driving and driven clutch elements, said second clutch means being inoperative when said shoe is moving toward said roll and being operative to prevent said driven clutch element from overrunning said driving clutch element when said shoe is moving away from said roll.

JOHN P. JONES.
HAROLD F. BROGDON.

References Cited in the file of this patent
UNITED STATES PATENTS

| Number | Name | Date |
|---|---|---|
| 2,346,374 | Freis | Apr. 11, 1944 |
| 2,565,199 | Bradley | Aug. 21, 1951 |